United States Patent
Chen

(10) Patent No.: US 6,368,032 B1
(45) Date of Patent: Apr. 9, 2002

(54) CHAMFER CUTTER

(76) Inventor: Nien-Chien Chen, No. 31-6, Teng-Hu Lane, Chu-Shan Chen, Nantou Hsien (TW)

(*) Notice: Subject to any disclaimer, the term of this patent is extended or adjusted under 35 U.S.C. 154(b) by 0 days.

(21) Appl. No.: 09/723,622

(22) Filed: Nov. 27, 2000

(51) Int. Cl.⁷ .............................................. B23B 51/10
(52) U.S. Cl. .......................... 408/146; 408/80; 408/186
(58) Field of Search .................................. 408/113, 146, 408/80, 186, 191, 192, 199, 203, 197, 198, 241 S

(56) References Cited

U.S. PATENT DOCUMENTS

| | | | | | |
|---|---|---|---|---|---|
| 2,187,221 A | * | 1/1940 | Brown | ........................ | 408/201 |
| 2,929,278 A | * | 3/1960 | Muldoon | .................... | 408/146 |
| 3,645,640 A | * | 2/1972 | Zukas | ........................ | 408/192 |
| 3,762,831 A | * | 10/1973 | Nicholson | ................... | 408/198 |

FOREIGN PATENT DOCUMENTS

| | | | | |
|---|---|---|---|---|
| DE | | 3233435 A | * | 3/1983 |

* cited by examiner

*Primary Examiner*—Daniel W. Howell
(74) *Attorney, Agent, or Firm*—Dellett and Walters

(57) ABSTRACT

A chamfer cutter for machining a counter sink in a threaded hole of a work piece is composed of a housing and a tool rest. The housing has a tapering part at a bottom thereof and a chamber at a top thereof. A first channel is defined at an outer periphery of the housing. The tool rest is received in the chamber and has an annular slot defined at an upper portion thereof and a second channel longitudinally defined at an outer periphery. A first screw extends through a first threaded aperture in the housing. A tool blade is received in the first and second channels and fastened by second screws extending through second threaded apertures in the tool rest. A third screw extends through a third threaded aperture in an upper surface of the tool rest and in aligned with the second channel. A fourth screw extends through a fourth threaded aperture longitudinally defined through the tool rest. A blind hole is defined at a bottom surface of the tool rest and a resilient member is provided in the blind hole. By turning the third screw, a distance between a cutting edge of the tool blade and a bottom of the tapering part can be adjusted. By turning the fourth screw, a running distance of the tool blade is adjusted.

5 Claims, 6 Drawing Sheets

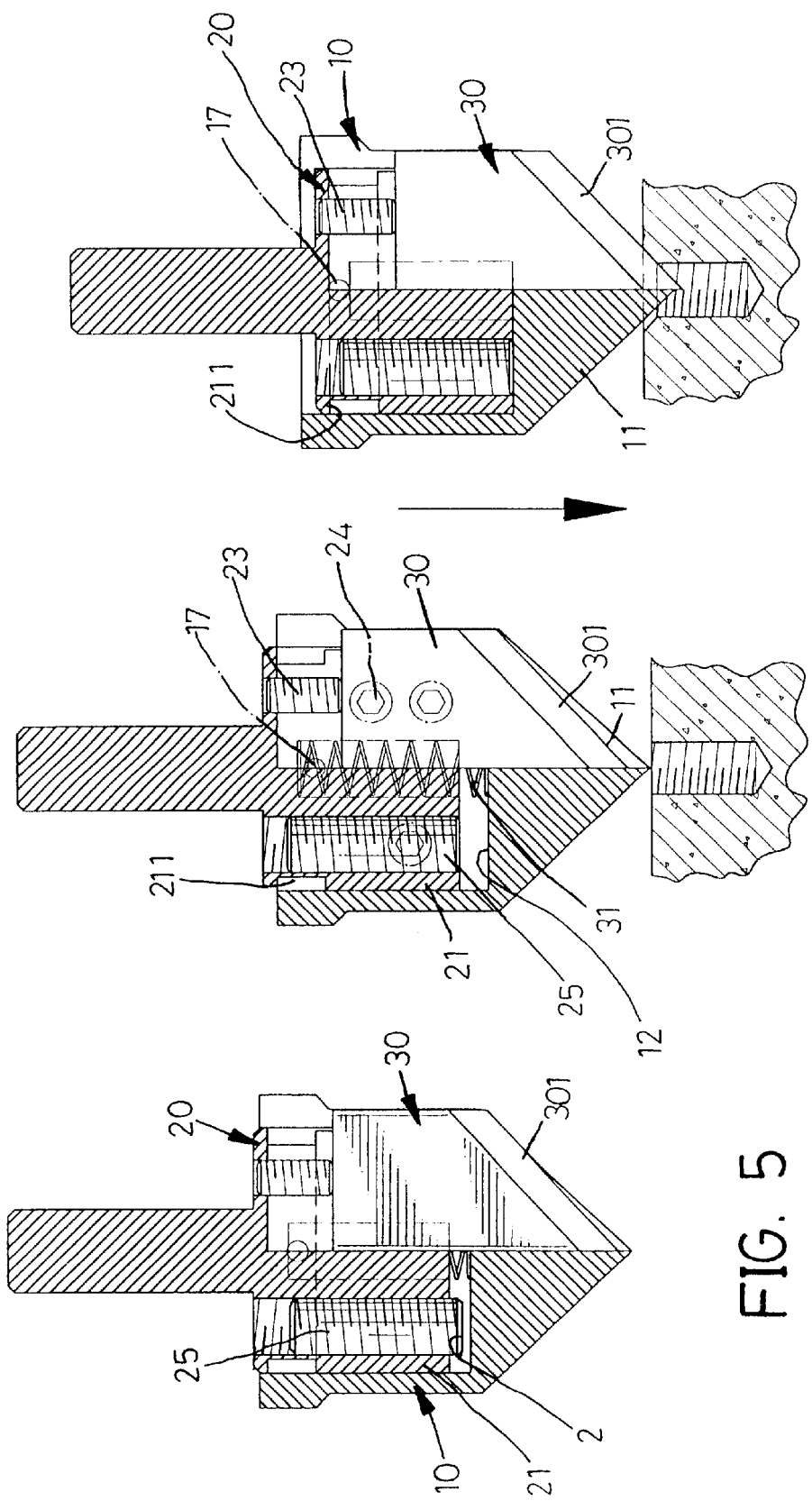

CHAMFER CUTTER

BACKGROUND OF THE INVENTION

1. Field of the Invention

The present invention is related to a chamfer cutter, and more particular to a chamfer cutting tool which is used for chamfering a threaded hole.

2. Description of Related Art

In general, a countersink has to be machined in a threaded hole of a work piece, so that a head of a screw may be flush with a surface of the work piece, etc. A conventional chamfer cutter, as shown in FIGS. 7 and 8, is composed of a tool rest (40), a housing (50), a tool blade (41), an adjusting nut (60), and a locking nut (61).

The tool rest (40) has a lower smooth part (401) and an upper threaded part (402). A shaft (403) is provided on a top of the tool rest (40) for fitting in a clamping chuck (not shown or numbered). A first channel (404) is longitudinally defined through an outer periphery of the tool rest (40). Two first threaded apertures (405) are transversally defined in the outer periphery of the tool rest (40) and in communication with the first channel (404). The tool blade (41) is received in the first channel (404) and two first screws (42) respectively extend through the first threaded apertures (405) to fasten the tool blade (41). A blind hole (406) is defined at a bottom surface of the tool rest (40) and a resilient member (43) is provided in the blind hole (406).

The housing (50) has a tapering part (51) formed at a bottom end thereof. A chamber (52) is defined at a top of the housing (50). A second channel (53) is longitudinally defined at an outer periphery of the housing (50) and in alignment with the first channel (404). The tool blade (41) is also received in the second channel (53). An annular slot (54) is defined at an upper portion of the outer periphery of the housing (50).

The tool rest (40) is received in the chamber (52) with the threaded part (404) extending out from the housing (50). The adjusting nut (60) with a female thread (602) and the locking nut (61) are in turn engaged with the threaded part (404). The adjusting nut (60) has a flange (601) in alignment with the annular slot (54), and two second threaded apertures (not numbered) transversally defined through the flange (601). Two second screws (603) respectively extend through the second threaded apertures to enter into the annular slot (54) and abut an upper edge of the annular slot (54) under a force of the resilient member (43).

In machining of a threaded hole of a component, when the tapering part (51) is stopped by a periphery defining the threaded hole, the tool rest (40) can continue to move down to chamfer the threaded hole and will not stop until the second screws (603) arrive at a bottom edge of the annular slot (54).

Referring to FIG. 9, in adjustment, the locking nut (61) and the adjusting nut (60) are screwed up to decrease a distance between a cutting edge (411) of the tool blade (41) and a bottom edge of the tapering part (51). Thus, the cutter can chamfer a deeper countersink.

However, the conventional chamfer cutter has following shortcomings:

1. It is inconvenient to adjust the cutting edge (411) by screwing the adjusting nut (60) and the locking nut (61).

2. Because the threaded part is provided on the tool rest for engaging with the nuts (60, 61), the chamfer cutter is long and vibrations and shudders can transmit along the cutter during a machining operation.

3. The chamfer cutter has a high manufacturing cost because of the large number of elements.

Therefore, the invention provides an improved chamfer cutter to mitigate and/or obviate the aforementioned problems.

SUMMARY OF THE INVENTION

A main objective of the present invention is to provide a chamfer cutter which is easy to be adjusted.

Another objective of the present invention is to provide a chamfer cutter which has no vibration or shudder during use in a machining operation.

Another objective of the present invention is to provide a chamfer cutter which has a low manufacturing cost.

Other objects, advantages and novel features of the invention will become more apparent from the following detailed description when taken in conjunction with the accompanying drawings.

BRIEF DESCRIPTION OF THE DRAWINGS

FIG. 3 is a cross sectional view of the chamfer cutter;

FIG. 4 is a cross sectional view showing that the chamfer cutter is actuated to cut a threaded hole;

FIG. 5 is a cross sectional view showing that a tool blade of the chamfer cutter is adjusted;

DETAILED DESCRIPTION OF THE PREFERRED EMBODIMENT

Figure 1:
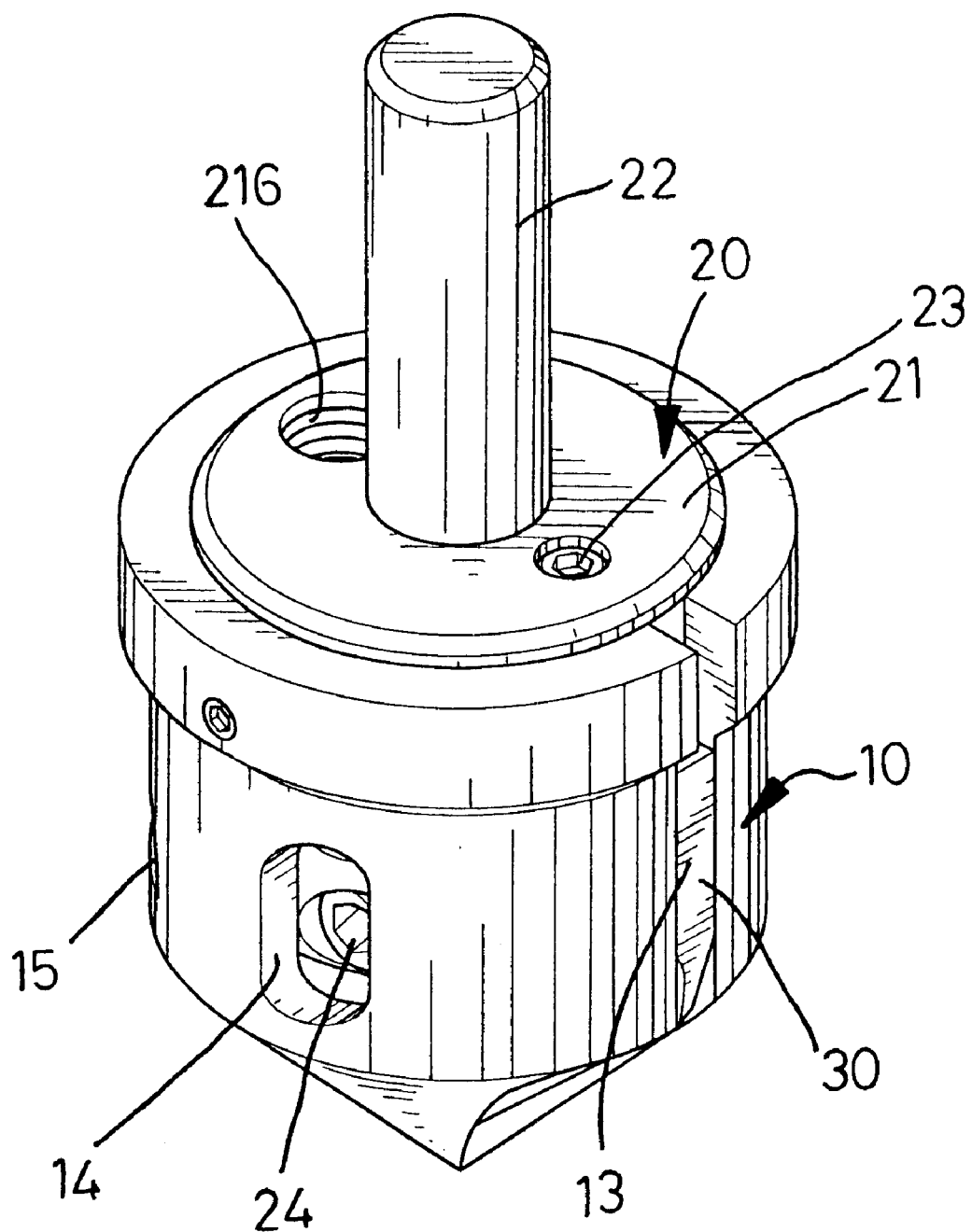
FIG. 1 is a perspective view of a chamfer cutter in accordance with the invention.
Figure 2:
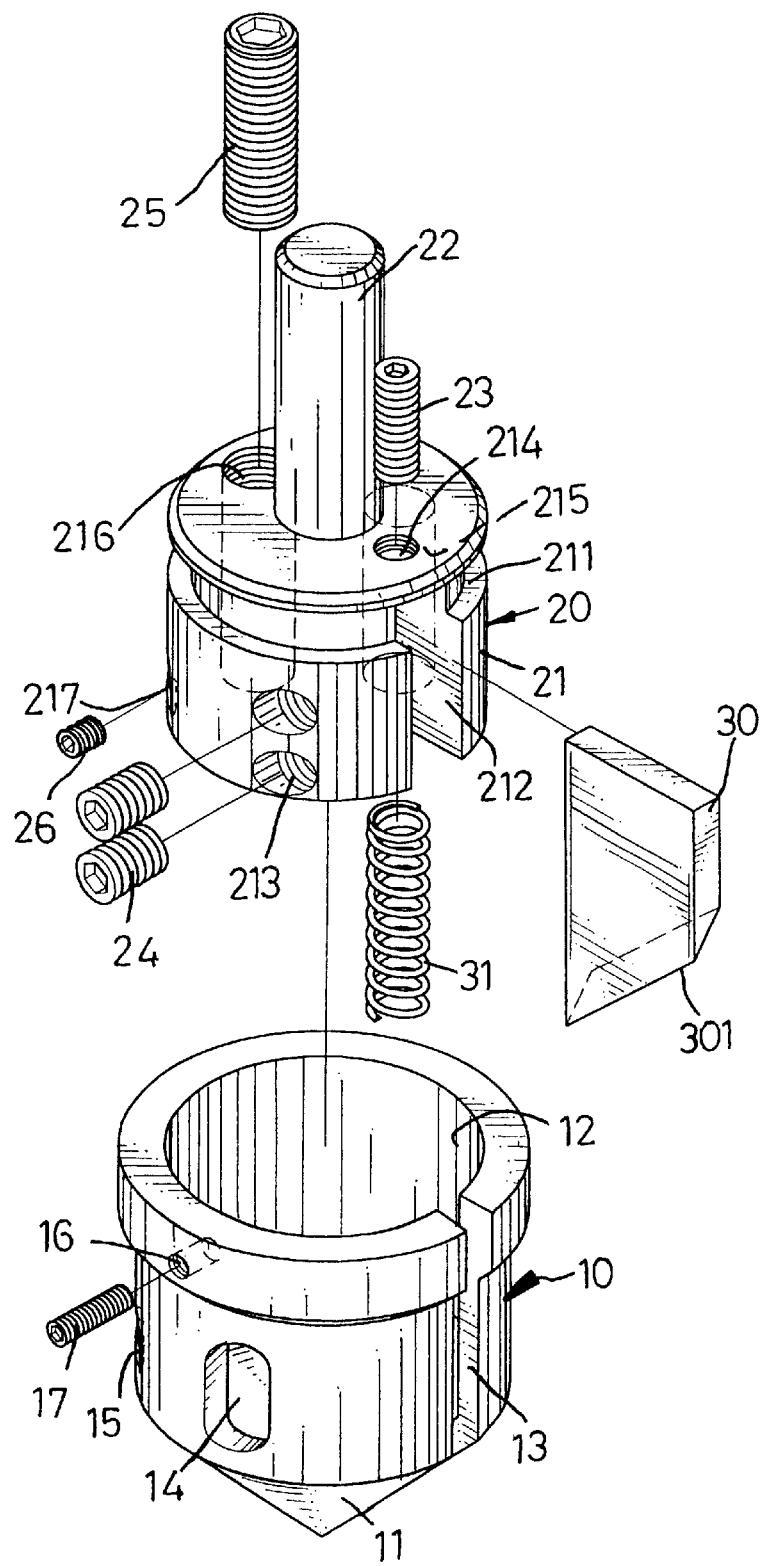
FIG. 2 is an exploded perspective view of the chamfer cutter in FIG. 1.

Referring to FIGS. 1 and 2, a chamfer cutter for a threaded hole in accordance with the invention is composed of a housing (10), a tool rest (20), and a tool blade (30).

The housing (10) has a tapering part (11) formed at a bottom thereof and a chamber (12) defined at a top thereof. A first channel (13) is longitudinally defined at an outer periphery of the housing (10) and in communication with the chamber (12). A first opening (14) and a second opening (15) are defined through the housing (10). A first threaded aperture (16) is defined through a flange (not numbered) formed at an upper end of the housing (10).

The tool rest (20) is received in the chamber (12) of the housing (10) and has a shaft (22) formed at a top end thereof for fitting in a clamping chuck (not shown or numbered). A second channel (212) is longitudinally defined at an outer periphery (21) of the tool rest (20) and aligned with the first channel (13) of the housing (10). An annular slot (211) is defined at an upper portion of the tool rest (20). The second channel (212) is defined through a bottom of the tool rest (20) and ended at an upper edge of the annular slot (211). A first screw (17) extends through the first threaded aperture (16) and enters the annular slot (211). A blind hole (215) is defined at a bottom surface of the tool rest (20) and a resilient member (31) is provided in the blind hole (215). Under the force of the resilient member (31), the tool rest (20) is pushed upwards and the first screw (17) abuts a bottom edge of the annular slot (211).

The tool blade (30) is mounted in the first channel (13) and the second channel (212). Two second threaded apertures (213) are transversally defined through the outer periphery (21) of the tool rest (20) and in communication with the second channel (212). Two second screws (24) respectively extend through the second threaded apertures (213) to fasten the tool blade (30). A third threaded aperture (214) is longitudinally defined through a top surface of the tool rest (20) and in alignment with the second channel (212). A third screw (23) extends through the third threaded aperture (214) and abuts the tool blade (30) with a bottom end thereof. A fourth threaded aperture (216) is longitudinally defined through the tool rest (20) and a fourth screw (25) extends in the fourth threaded aperture (216). A fifth threaded aperture (217) is transversally defined at the outer periphery (21) and in communication with the fourth threaded aperture (216), and a fifth screw (26) extends through the fifth threaded aperture (217) to fasten the fourth screw (25). The second threaded apertures (213) and the fifth threaded aperture (217) are respectively aligned with the first opening (14) and the second opening (15) for access of a screwdriver for adjustment.

Referring to FIGS. 3 and 4, when the cutter of the invention is used to chamfer a threaded hole of a work piece, the housing (10) is stopped by a periphery defining an opening of the threaded hole, and the tool blade (30) can move down along the first channel (13) and the second channel (212), and a cutting edge (301) of the tool blade (30) extends out to chamfer the threaded hole of the work piece.

Referring to FIG. 5, there are two adjustments for the cutter according to the invention.

If a threaded hole of a work piece has a small diameter, a distance between the cutting edge (301) and a bottom edge of the tapering part (11) must be reduced. In this case, the second screws (24) are loosened and the third screw (23) is screwed in to push the tool blade (30) downwards to decrease the distance between the cutting edge (301) and the bottom edge of the tapering part (11). Afterwards, the second screws (24) are tightened again.

If the chamfer cutter is used to form a shallow countersink in a work piece, the working stroke of the tool blade (30) must be reduced. In this case, the fifth screw (26) is loosened and the fourth screw (25) is screwed downwards to extend out from the fourth threaded aperture (216). Afterwards, the fifth screw (26) is tightened again. Thus, when the fourth screw (25) contacts with the bottom of the chamber (12), the tool rest (20) is stopped.

Figure 6:
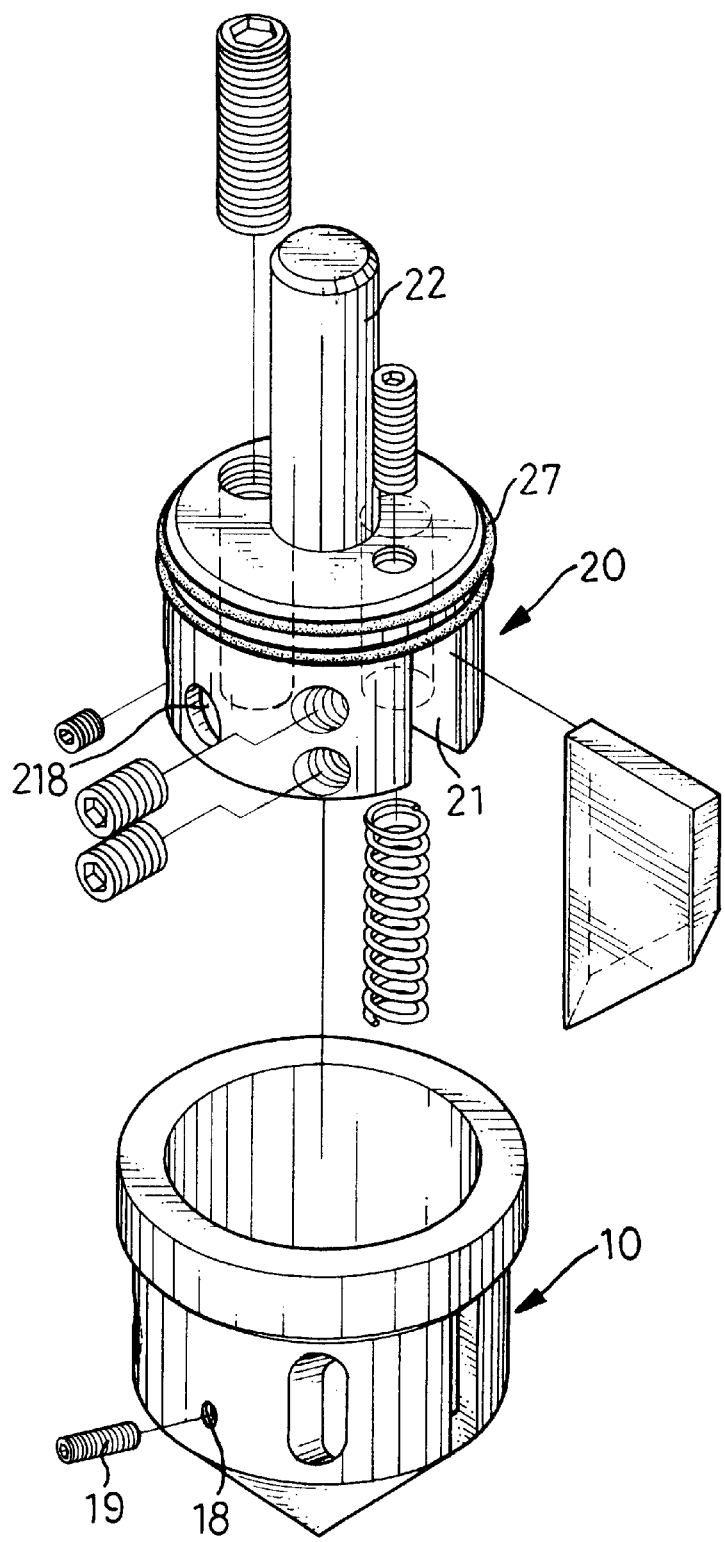
FIG. 6 is an exploded perspective view of another embodiment in accordance with the present invention.
Figure 7:
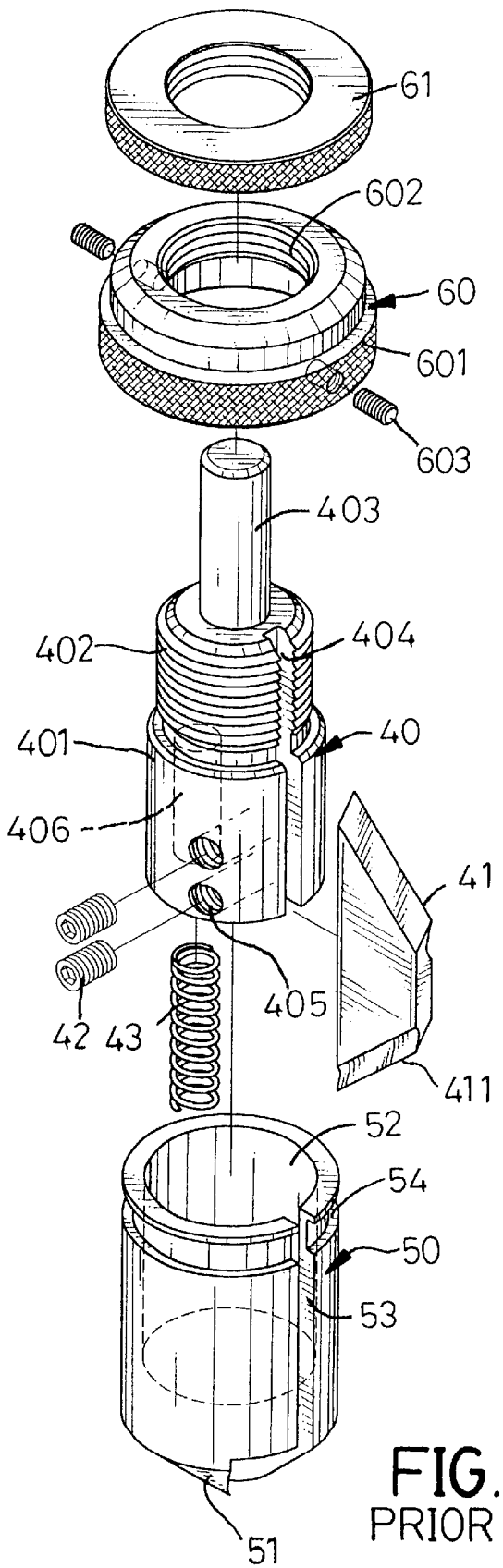
FIG. 7 is an exploded perspective view of a conventional chamfer cutter.
Figure 9:
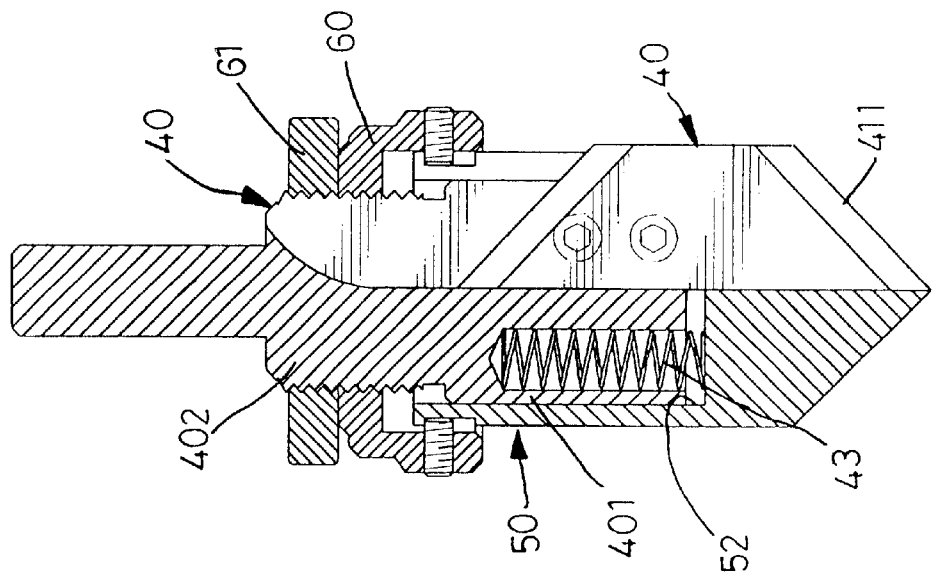
FIG. 9 is a cross sectional view showing that a tool blade of the conventional chamfer cutter is adjusted.
Figure 8:
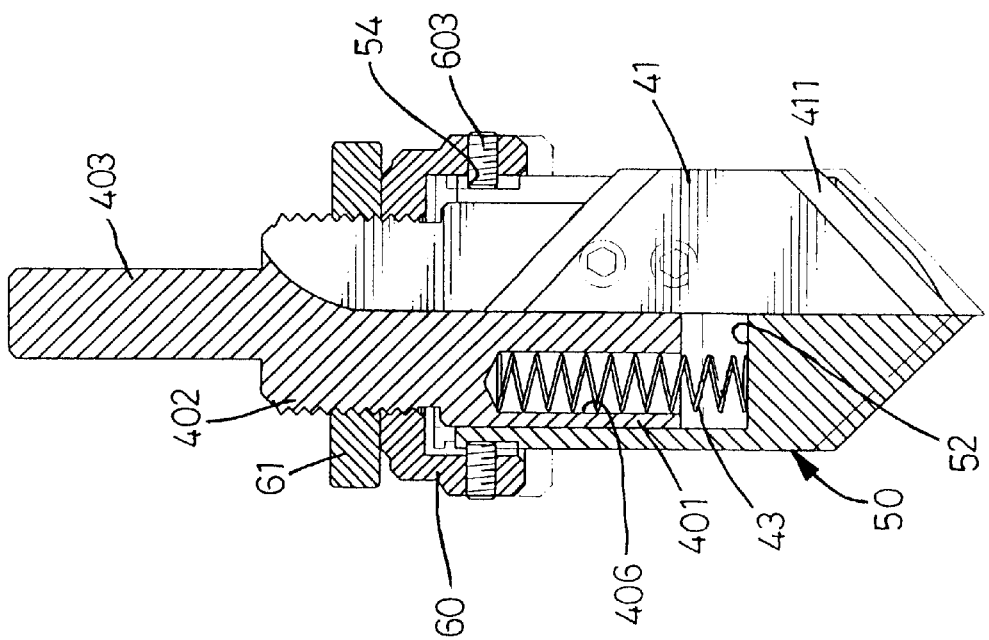
FIG. 8 is a cross sectional view of the conventional chamfer cutter of FIG. 7.

Referring to FIG. 6, in a second embodiment of the present invention, the first threaded aperture (16') is defined through the outer periphery of the housing (10). A third opening (218) is defined at the outer periphery (21) of tool rest (20) and aligned with the first threaded aperture (16'). The first screw (17') extends through the first threaded aperture (16') and the third opening (218) to limit the working stroke of the tool blade (30). An 0-ring (27) is provided in the annular slot (211) to prevent dust from entering into the chamber (12).

The present invention has following advantages:

1. It is very convenient for a user to adjust the tool blade by adjusting various screws.

2. The length of the chamfer cutter is shorter than that of the conventional cutter, so no vibrations or shudders occur during a machining operation.

3. The number of elements is few, and the manufacturing cost is low.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chamfer cutter, comprising:

a housing (10) having a tapering part (11) formed at a bottom thereof, a chamber (12) defined at a top thereof, a first channel (13) longitudinally defined at an outer periphery thereof and in communication with the chamber (12), a first opening (14) and a second opening (15) respectively defined therethrough, a first threaded aperture (16) defined through an upper portion thereof, and a first screw (17) extending through the first threaded aperture (16);

a tool rest (20) received in the chamber (12) of the housing (10), the tool rest (20) having an annular slot (211) defined at an upper portion thereof and in alignment with the first threaded aperture (16) for the entrance of the first screw (17) into the annular slot (211), a second channel (212) longitudinally defined in an outer periphery (21) thereof and ended at an upper edge of the annular slot (211) and aligned with the first channel (13), two second threaded apertures (213) defined through the outer periphery (21) and in communication with the second channel (212), two second screws (24) respectively extending through the second threaded apertures (213), a third threaded aperture (214) longitudinally defined through an upper surface thereof and in alignment with the second channel (212), a third screw (23) extending through the third threaded aperture (214), a blind hole (215) defined at a bottom surface thereof, a resilient member (31) provided in the blind hole (215), a fourth threaded aperture (216) longitudinally defined therethrough, and a fourth screw (25) extending through the fourth threaded aperture (216); and a tool blade (30) received in the first channel (13) and the second channel (212) and fastened by the second screws (24), the tool blade (30) having a cutting edge (301) formed at a bottom thereof.

2. The chamfer cutter as claimed in claim 1, wherein the tool rest (20) further has a fifth threaded aperture (217) defined through the outer periphery (21) and in communication with the fourth threaded aperture (216), and a fifth screw (26) extending through the fifth threaded aperture (217) to position the fourth screw (25).

3. A chamfer cutter, comprising:

a housing (10) having a tapering part (11) formed at a bottom thereof, a chamber (12) defined at a top thereof, a first channel (13) longitudinally defined at an outer periphery thereof and in communication with the chamber (12), a first opening (14) and a second opening (15) respectively defined through the outer periphery thereof, a first threaded aperture (16') defined through the outer periphery thereof, and a first screw (17') extending through the first threaded aperture (16');

a tool rest (20) received in the chamber (12) of the housing (10), the tool rest (20) having an annular slot (211) defined at an upper portion thereof, a second channel (212) longitudinally defined in an outer periphery (21) thereof and ended at an upper edge of the annular slot (211) and aligned with the first channel (13), two second threaded apertures (213) defined through the outer periphery (21) and in communication with the second channel (212), two second screws (24) respectively extending through the second threaded apertures (213), a third threaded aperture (214) longitudinally defined through an upper surface thereof and in alignment with the second channel (212), a third screw (23) extending through the third threaded aperture (214), a blind hole (215) defined at a bottom surface thereof, a resilient member (31) provided in the blind hole (215), a fourth threaded aperture (216) longitudinally defined therethrough, a fourth screw (25) extending through the fourth threaded aperture (216), and a third opening (218) defined through the outer periphery (21) and in alignment with the first threaded aperture (218) for the first screw (17') entering into the third opening (218); and a tool blade (30) received in the first channel (13) and the second channel (212) and fastened by the second screws (24), the tool blade (30) having a cutting edge (301) formed at a bottom thereof.

4. The chamfer cutter as claimed in claim 3, wherein the tool rest (20) further has a fifth threaded aperture (217) defined through the outer periphery (21) and in communication with the fourth threaded aperture (216), and a fifth screw (26) extending through the fifth threaded aperture (217) to position the fourth screw (25).

5. The chamfer cutter as claimed in claim 3, wherein the tool rest (20) further has an O-ring (27) provided in the annular slot (211).

* * * * *